(12) United States Patent
Lee et al.

(10) Patent No.: US 7,898,621 B2
(45) Date of Patent: Mar. 1, 2011

(54) LIQUID CRYSTAL DISPLAY

(75) Inventors: Sin-Doo Lee, Seoul (KR); Yeun-Tae Kim, Seoul (KR); Cherlhyun Jeong, Seoul (KR); Sang-Wook Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 983 days.

(21) Appl. No.: 11/439,761

(22) Filed: May 23, 2006

(65) Prior Publication Data

US 2006/0286464 A1 Dec. 21, 2006

(30) Foreign Application Priority Data

Jun. 15, 2005 (KR) .................. 10-2005-0051440

(51) Int. Cl.
*G02F 1/1337* (2006.01)
(52) U.S. Cl. ............... 349/123; 349/130; 349/132
(58) Field of Classification Search .......... 385/123, 385/124, 130, 132; 349/123, 124, 130, 132
See application file for complete search history.

(56) References Cited

U.S. PATENT DOCUMENTS

| | | | | |
|---|---|---|---|---|
| 5,866,034 | A | * | 2/1999 | Han .................. 252/299.4 |
| 6,608,661 | B1 | | 8/2003 | Schadt et al. |
| 2002/0159018 | A1 | | 10/2002 | Kawasaki |

FOREIGN PATENT DOCUMENTS

| | | |
|---|---|---|
| JP | 08-022007 | 1/1996 |
| JP | 2002-090750 | 3/2002 |
| JP | 2004-219936 | 8/2004 |
| JP | 2004-309780 | 11/2004 |
| KR | 10-1997-0016697 | 4/1997 |
| KR | 10-1998-00057609 | 9/1998 |
| KR | 1020000060800 A | 10/2000 |
| KR | 1020010001775 A | 1/2001 |
| KR | 1020010111812 A | 12/2001 |
| KR | 1020040098327 A | 11/2004 |
| KR | 1020050004455 A | 1/2005 |

OTHER PUBLICATIONS

Patent Abstracts of Japan, Publication No. 08-022007, Jan. 23, 1996, 1 page.
Patent Abstracts of Japan, Publication No. 2002-090750, Mar. 27, 2002, 1 page.
Patent Abstracts of Japan, Publication No. 2004-219936, Aug. 5, 2004, 1 page.
Patent Abstracts of Japan, Publication No. 2004-309780, Nov. 4, 2004, 1 page.

(Continued)

*Primary Examiner* — Sarah Hahm
(74) *Attorney, Agent, or Firm* — Innovation Counsel, LLP (57) ABSTRACT

An LCD according to an embodiment of the present invention includes: a first substrate; a first electrode disposed on the first substrate; a second substrate facing the first substrate; a second electrode disposed on the second substrate; a liquid crystal layer disposed between the first electrode and the second electrode; and a first alignment film attached on the first electrode and having a position-dependent thickness that achieves variations of the dielectric constant of from 1 to about 50.

17 Claims, 12 Drawing Sheets

OTHER PUBLICATIONS

Patent Abstracts of Korea, Publication No. 10-1997-0016697, Apr. 28, 1997, 1 page.
Patent Abstracts of Korea, Publication No. 10-1998-00057609, Sep. 25, 1998, 1 page.
Patent Abstracts of Korea, Publication No. 1020000060800 A, Oct. 16, 2000, 1 page.
Patent Abstracts of Korea, Publication No. 1020010001775 A, Jan. 5, 2001, 1 page.
Patent Abstracts of Korea, Publication No. 1020010111812 A, Dec. 20, 2001, 1 page.
Patent Abstracts of Korea, Publication No. 1020040098327 A, Nov. 20, 2004, 1 page.
Patent Abstracts of Korea, Publication No. 1020050004455 A, Jan. 12, 2005, 1 page.
Kim, Yeun-Tae et al., "P-91 Technology of Spontaneously Forming Multidomains for Wideviewing Angle LCDs," Society for Information Display, 2005 International Symposium, Digest of Technical Papers, vol. XXXVI, Book I, Hynes Convention Center, Boston, Massachusetts, May 24, 2005, pp. 638-641.

* cited by examiner

LIQUID CRYSTAL DISPLAY

CROSS-REFERENCE TO RELATED APPLICATION

This application claims priority to and the benefit of Korean Patent Application No. 10-2005-0051440 filed in the Korean Intellectual Property Office on Jun. 15, 2005, the entire contents of which are incorporated herein by reference.

FIELD OF THE INVENTION

The present invention relates to a liquid crystal display.

DESCRIPTION OF THE RELATED ART

Because the LCD has a reference viewing angle narrower than emissive display devices such as cathode-ray tubes (CRT), the reference viewing-angle of the LCD needs to be improved for application to large screen devices such as HDTV television sets. The recent suggestions for improving the narrow reference viewing angle of the LCD are in-plane switching (IPS), multi-alignment (MA), and optical compensation films. In-plane switching improves the reference viewing angle by causing the optic axes of the liquid crystal molecules to lie in a plane parallel to that of the substrates. The multi-alignment approach provides each pixel with several regions having different optic axes to improve viewing characteristics. Optical compensation films compensate for the variation of birefringence depending on azimuth. Unfortunately, IPS has low aperture ratio and slow response time, MA requires complicated manufacturing processes, and the use of compensation films is expensive. Thus, a new technology is required to improve a reference viewing angle.

SUMMARY OF THE INVENTION

An LCD according to an embodiment of the present invention includes an alignment film that provides variations of the dielectric constant from about 1 to about 50, and which has a position-dependent thickness and patterned surface that contacts a liquid crystal layer and a transparent dielectric that magnifies the variations of the dielectric constant.

DETAILED DESCRIPTION OF THE EMBODIMENTS

In the drawings, the thickness of layers, films, panels, regions, etc. are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Referring to FIGS. 1-5, an LCD according an embodiment of the present invention includes a first panel 10, a second panel 20, and a liquid crystal layer 31 interposed between the first panel 10 and the second panel 20.

The first panel 10 includes a transparent substrate 1, a lower polarizing plate 3 attached to a lower surface of the transparent substrate 1, a transparent electrode 2 formed on an upper surface of the transparent substrate 1, and an alignment film 14 formed on the transparent electrode 2. The first panel 10 shown in FIGS. 4 and 5 further includes a homogeneous (or horizontal) alignment layer 26 formed on the alignment film 14. The first panel 10 shown in FIGS. 1 and 3 may further include a homeotropic (or vertical) alignment layer formed on the alignment film 14.

The second panel 20 includes a transparent substrate 21, an upper polarizing plate 23 attached to an upper surface of the transparent substrate 21, and a transparent electrode 22 formed on a lower surface of the transparent substrate 21. The second panel 20 further includes, on a lower surface of the transparent electrode 22, a liquid crystal alignment layer 24 shown in FIGS. 1 and 3, an alignment film 15 shown in FIGS. 2 and 5, or a homogeneous alignment layer 27 shown in FIGS. 4 and 5.

The alignment film 14 or 15 shown in FIGS. 1, 2, 4 and 5 has a surface facing the transparent electrode 2 or 22, which is provided with regularly arranged prominences and depressions. The depressions 16 are filled with transparent dielectric having dielectric constant from about one to about 50, which is different from the alignment film 14 or 15. An example of the transparent dielectric is air. The alignment film 14 shown in FIG. 3 has a surface facing the liquid crystal layer 31, which is provided with regularly arranged prominences and depressions. The depressions are filled transparent dielectric 17 that also provides a flat surface. Instead of providing the prominences and depressions, the alignment layer 14 has a regularly varying thickness.

The alignment film 14 and 15 vertically aligns liquid crystal molecules in the liquid crystal layer 31. However, the alignment film 14 and 15 may horizontally align the liquid crystal molecules of the liquid crystal layer 31. Transmission axes of the lower polarizing plate 3 and the upper polarizing plate 23 are crossed. For example, the transmission axis of the lower polarizing plate 3 points in the 0° direction, while the transmission axis of the upper polarizing plate 23 points in the 90° direction. However, the transmission axes of the polarizing plates 3 and 23 may be parallel to each other. One of the two polarizing plates 3 and 23 may be omitted. In this case, the transparent electrode 2 or 22 in the panel 10 or 20 opposite the remaining polarizing plate 3 or 23 may be substituted with a reflective electrode (not shown).

A portion of the transparent electrode 2 or 22 may be substituted with a reflective electrode or may be covered with a reflective electrode. The liquid crystal alignment layer 24 shown in FIGS. 1 and 3 may include a material that can align the liquid crystal molecules vertically to the surface of the transparent electrode 2. The aligning directions of the homogeneous alignment layers 26 and 27 shown in FIGS. 4 and 5 may be parallel to each other, or may make an angle of about 90°, 180°, or 270°. The liquid crystal layer 31 shown in FIGS. 1-3 may have negative dielectric anisotropy, while the liquid crystal layer 31 shown FIGS. 4 and 5 may have positive dielectric anisotropy. The thickness of the liquid crystal layer 31 can be easily adjusted.

The substrates 1 and 21 may be made from inflexible glass or flexible material such as plastic. A light source (not shown) may be provided exterior to the two panels 10 and 20.

In the above-described LCD, the prominences and depressions of the alignment film 14 and 15 differentiate effective dielectric constant depending on the position and the varying dielectric constant distorts electric field. Therefore, a plurality of molecular regions having different tilt directions and different tilt angles are formed in the liquid crystal layer 31, thereby widening the reference viewing angle.

Figure 6:
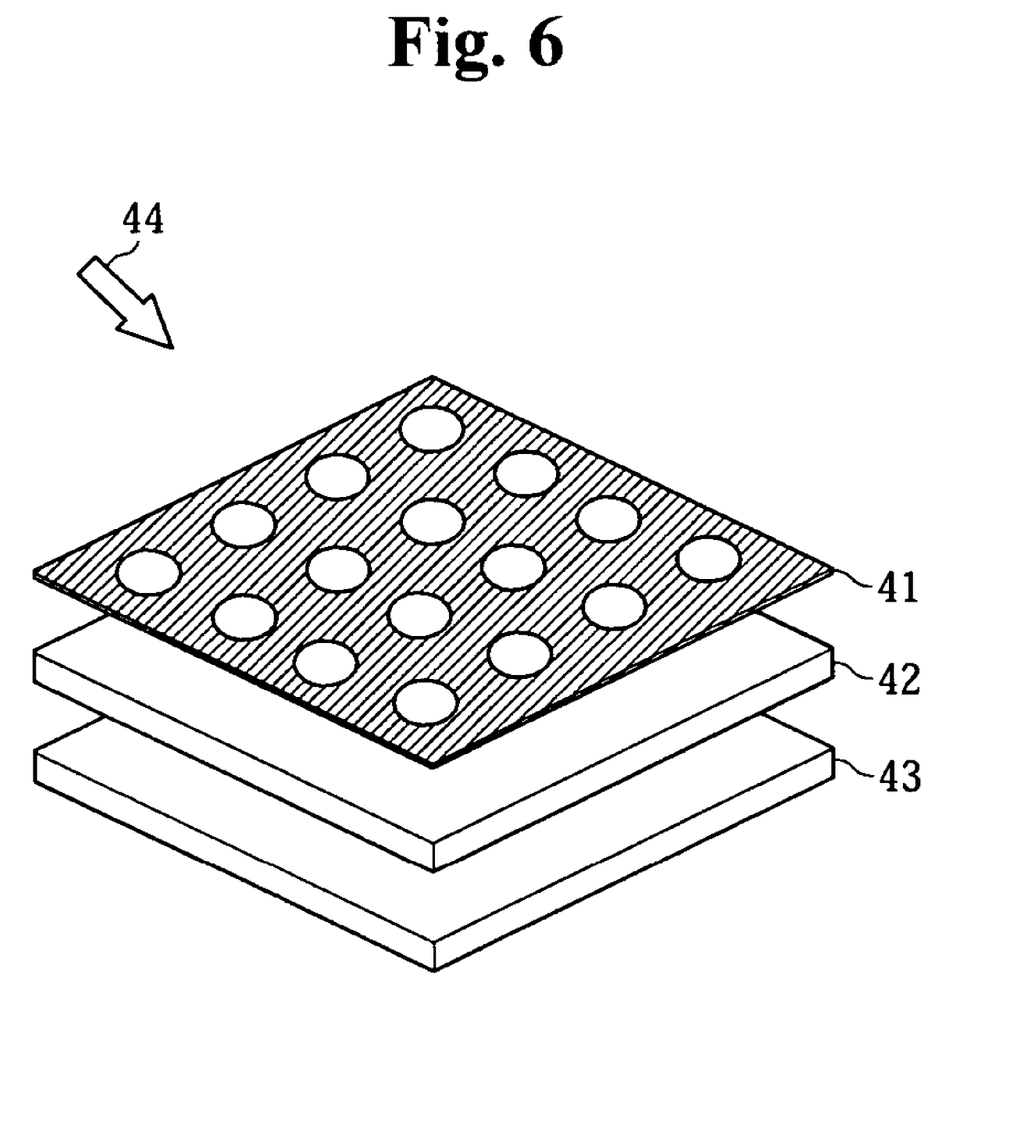
FIG. 6 is a perspective view of a mold for forming the alignment film of the LCDs shown in FIGS. 1-5 according to an embodiment of the present invention.

Now, a method of forming the alignment film of the LCDs shown in FIGS. 1-5 according to an embodiment of the present invention will be described in detail with reference FIGS. 6, 7 and 8. FIG. 6 is a perspective view of a mold for forming the alignment film of the LCDs shown in FIGS. 1-5 according to an embodiment of the present invention, FIG. 7A is a scanning electron microscope (SEM) photograph showing a surface of the mold manufactured by the method shown in FIG. 6, FIG. 7B is a graph illustrating surface height of the mold manufactured by the method shown in FIG. 6, FIG. 8A is a SEM photograph of a surface of an alignment film formed by the mold shown in FIG. 6, and FIG. 8B is a graph illustrating the thickness of the alignment film made of polydimethylsiloxane (PDMS) as function of spin coating speed (r.p.m).

Referring to FIG. 6, a photosensitive film 42 is spin-coated on a substrate 43 for manufacturing a mold. The photosensitive film 42 is made of a photo-reactive material such as NOA65 (produced by Norland Product, Inc.), which is reactive to ultraviolet light (UV). The photosensitive film 42 is exposed to UV 44 through a photo mask 41. After removing the photo mask 41, entire surface of the photosensitive film 42 is exposed to UV 44 such that the photosensitive film 42 is hardened.

Figure 7A:
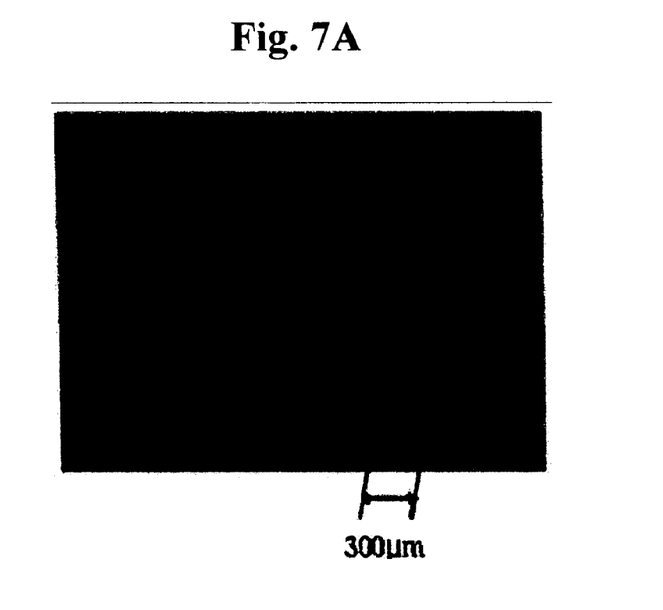
FIG. 7A is a scanning electron microscope (SEM) photograph showing a surface of the mold manufactured by the method shown in FIG. 6.
Figure 7B:
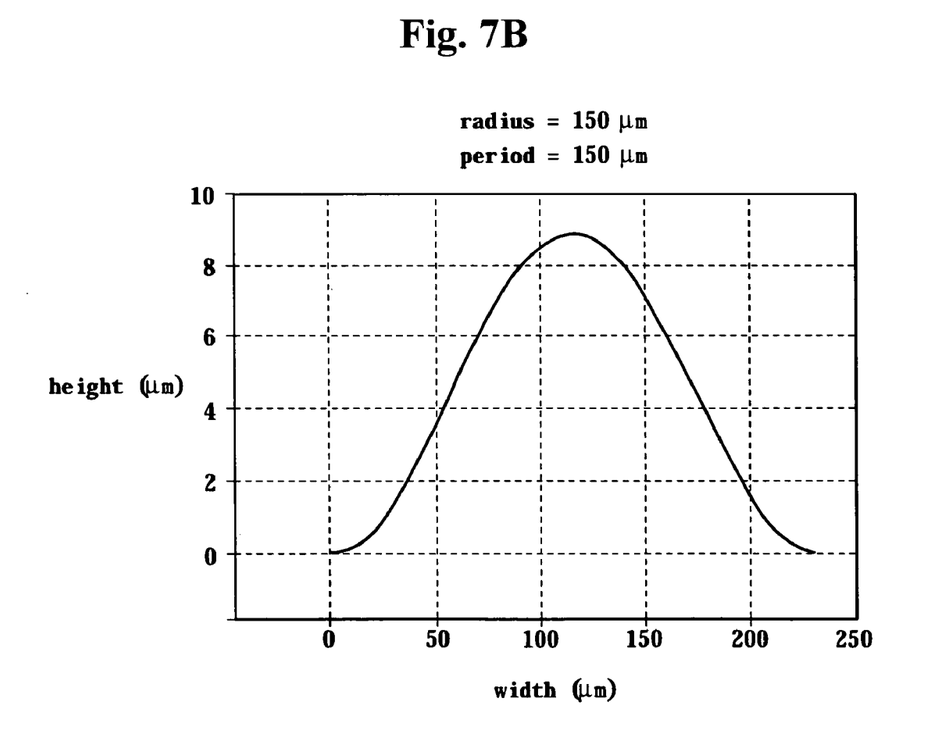
FIG. 7B is a graph illustrating surface height of the mold manufactured by the method shown in FIG. 6.
Figure 8A:
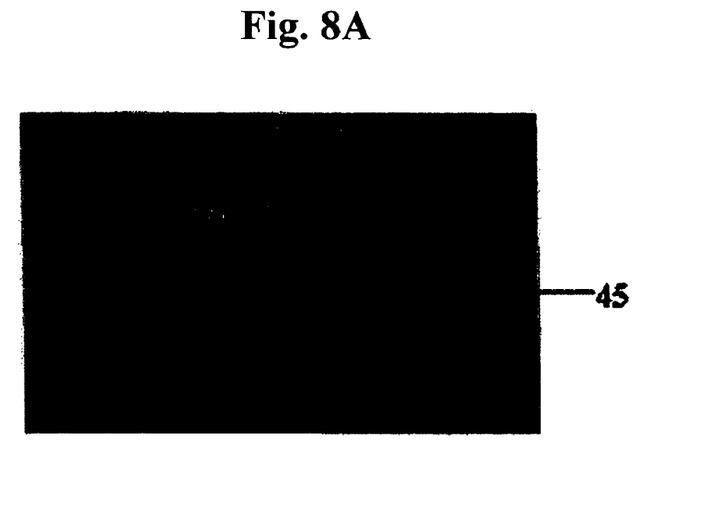
FIG. 8A is a SEM photograph of a surface of an alignment film formed by the mold shown in FIG. 6.
Figure 8B:
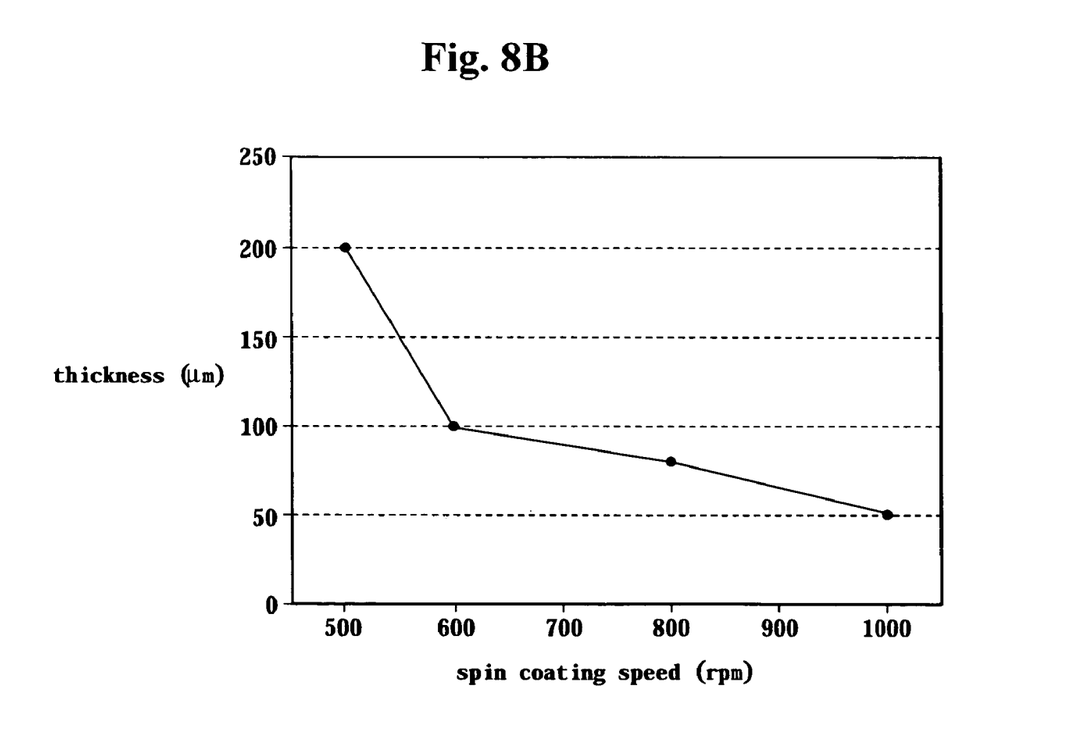
FIG. 8B is a graph illustrating the thickness of the alignment film made of polydimethylsiloxane as function of spin coating speed.

FIG. 7A illustrates an example of a mold formed by the above-described method. FIG. 7A shows a surface pattern of convex lenses as good as the pattern of the photo mask 41 shown in FIG. 6. The diameter of the prominences was equal to about 300 microns. FIG. 7B is a graph illustrating a surface height after illuminating the photosensitive film 42 with the UV 44 through the manufactured photo mask for about 15 seconds. The radius of the prominence was equal to about 150 microns and the period of the prominences was equal to about 45 microns. The prominence has a bisymmetry and the height difference was equal to about eight microns.

Using the mold manufactured by the above-described method, the alignment film 14 or 15 shown in FIGS. 1-5 is formed. The alignment film 14 and 15 is made from polydimethylsiloxane (PDMS), etc.

FIG. 8A shows a surface of the PDMS alignment film 45 formed by the mold manufactured by the method shown in FIG. 6. As shown in FIG. 8A, the PDMS alignment film 45 has a surface pattern having a period of about 450 microns and having a plurality of lens forms having a diameter of about 300 microns. The surface pattern was as good as the pattern of the mold shown in FIG. 7.

FIG. 8B shows a thickness of a PDMS alignment layer obtained by varying the spin-coating speed (rpm) but by maintaining the spin coating time of about 100 seconds.

Figure 9:
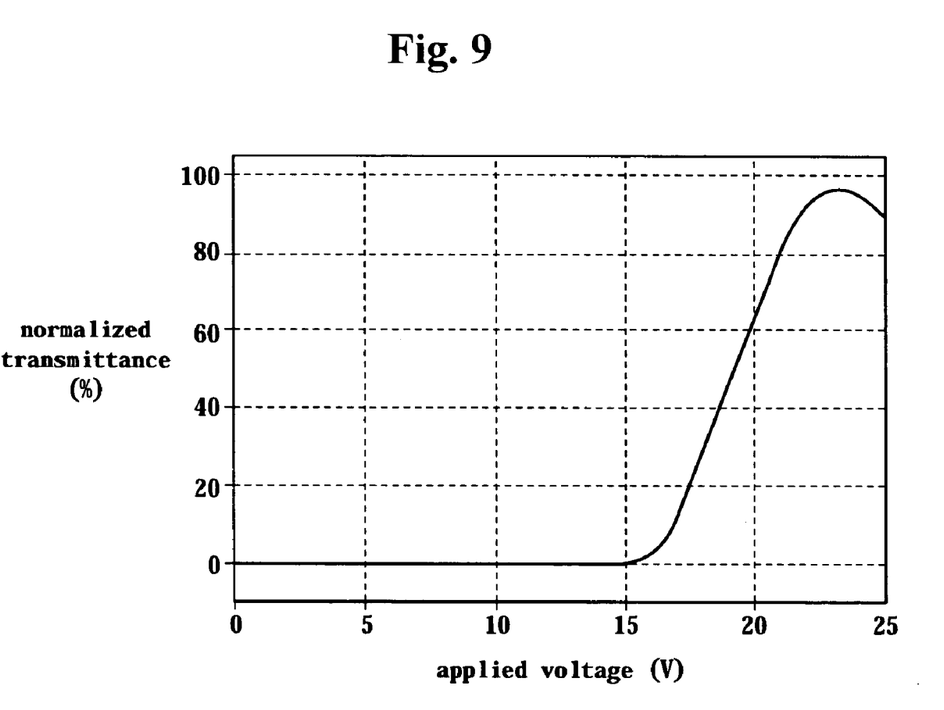
FIG. 9 shows an exemplary optical characteristic as function as voltage difference between the two electrodes.
Figure 10A:
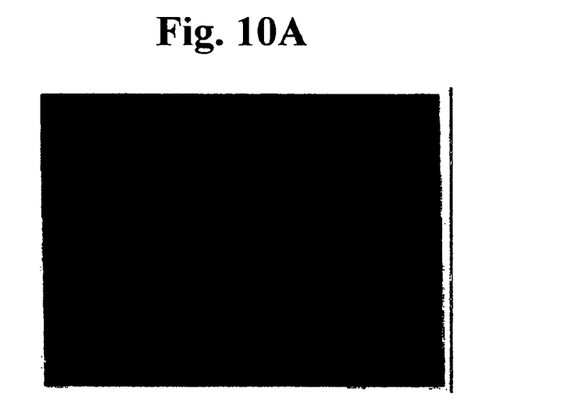
FIGS. 10A, 10B and 10C are photographs of an LCD obtained from a crossed polarizer microscope.
Figure 10B:
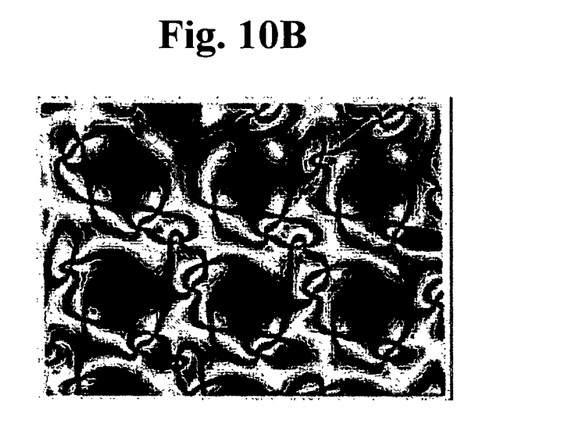
Figure 10C:
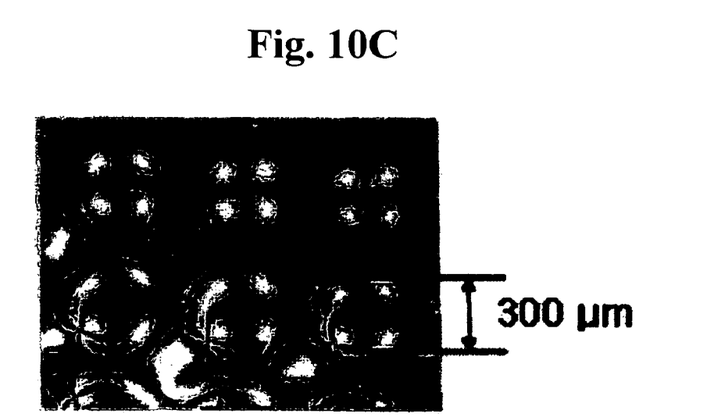

FIG. 9 shows an exemplary optical characteristic as function as voltage difference between the two electrodes 2 and 22. Referring to FIG. 9, the light starts to be transmitted at about 15V and the transmittance becomes the highest at about 24V. Therefore, voltages ranging from about 15V to about 24V can be used for gray scaling. FIGS. 10A-10C are photographs obtained from a crossed polarizer microscope for various voltage differences between the two transparent electrodes 2 and 22. FIG. 10A shows a completely dark state in absence of voltage difference between the two electrodes 2 and 22. The completely dark state may be resulted from the initial alignment that is nearly complete vertical. FIG. 10B is a photograph when the voltage difference was equal to about 18V. It is shown that the transmittance of the light periodically varies along the pattern of the alignment film 14. FIG. 10C is a photograph when the voltage difference was equal to about 24V. It is shown that multi-domains arranged in a period of about 300 microns are formed along the pattern of the alignment film 14.

Figure 1:
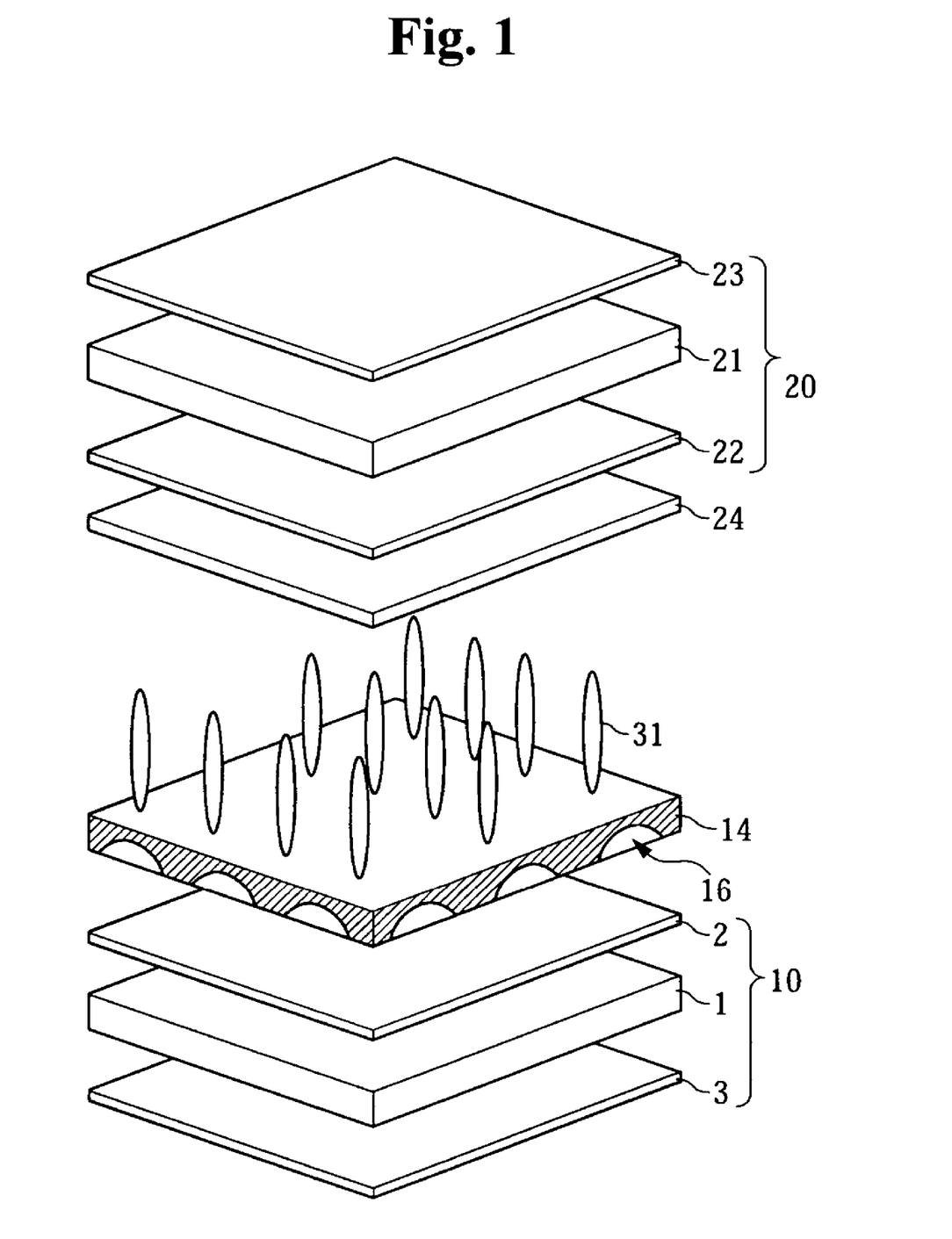
FIGS. 1, 2, 3, 4 and 5 are perspective views of LCDs according to embodiments of the present invention.
Figure 2:
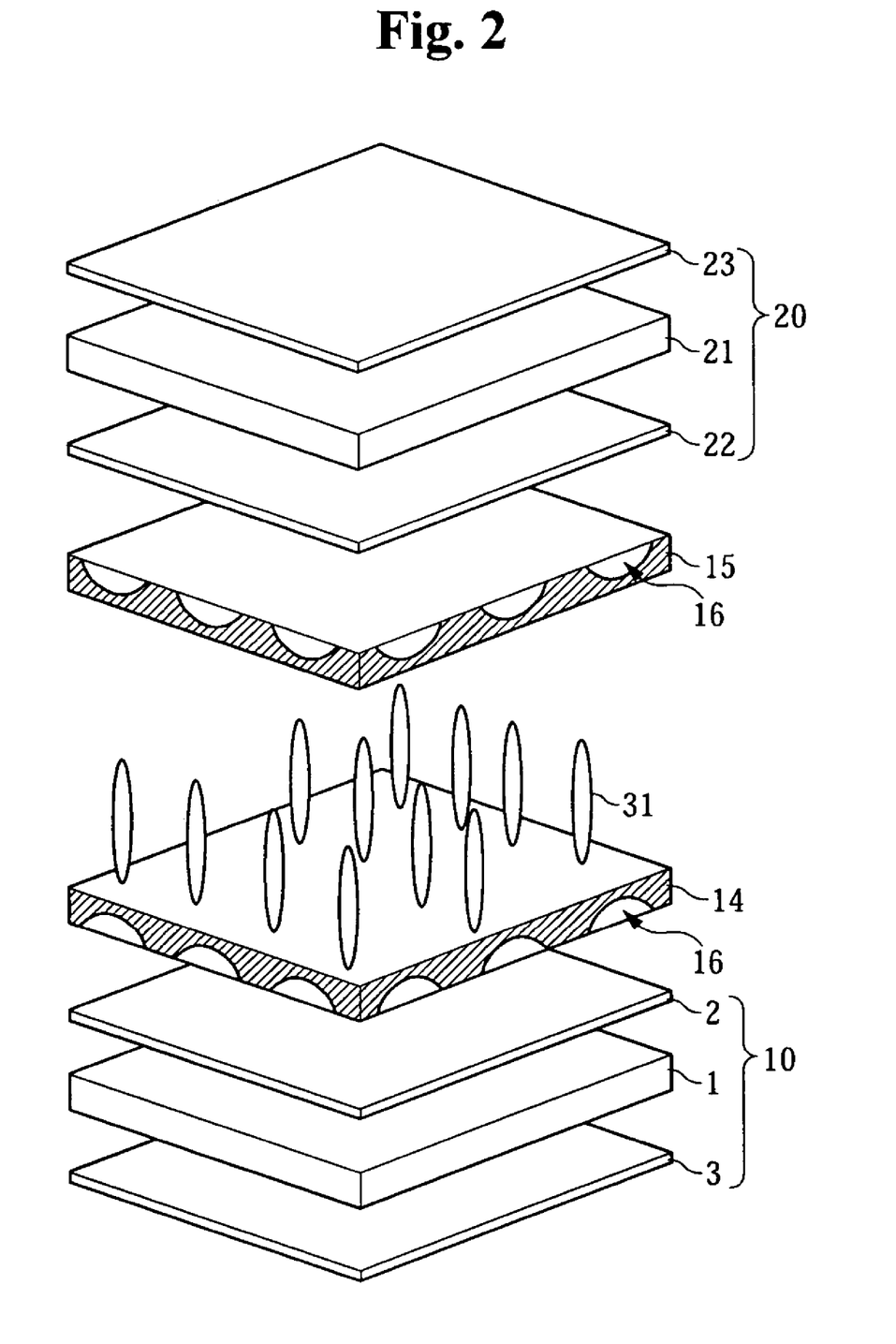
Figure 3:
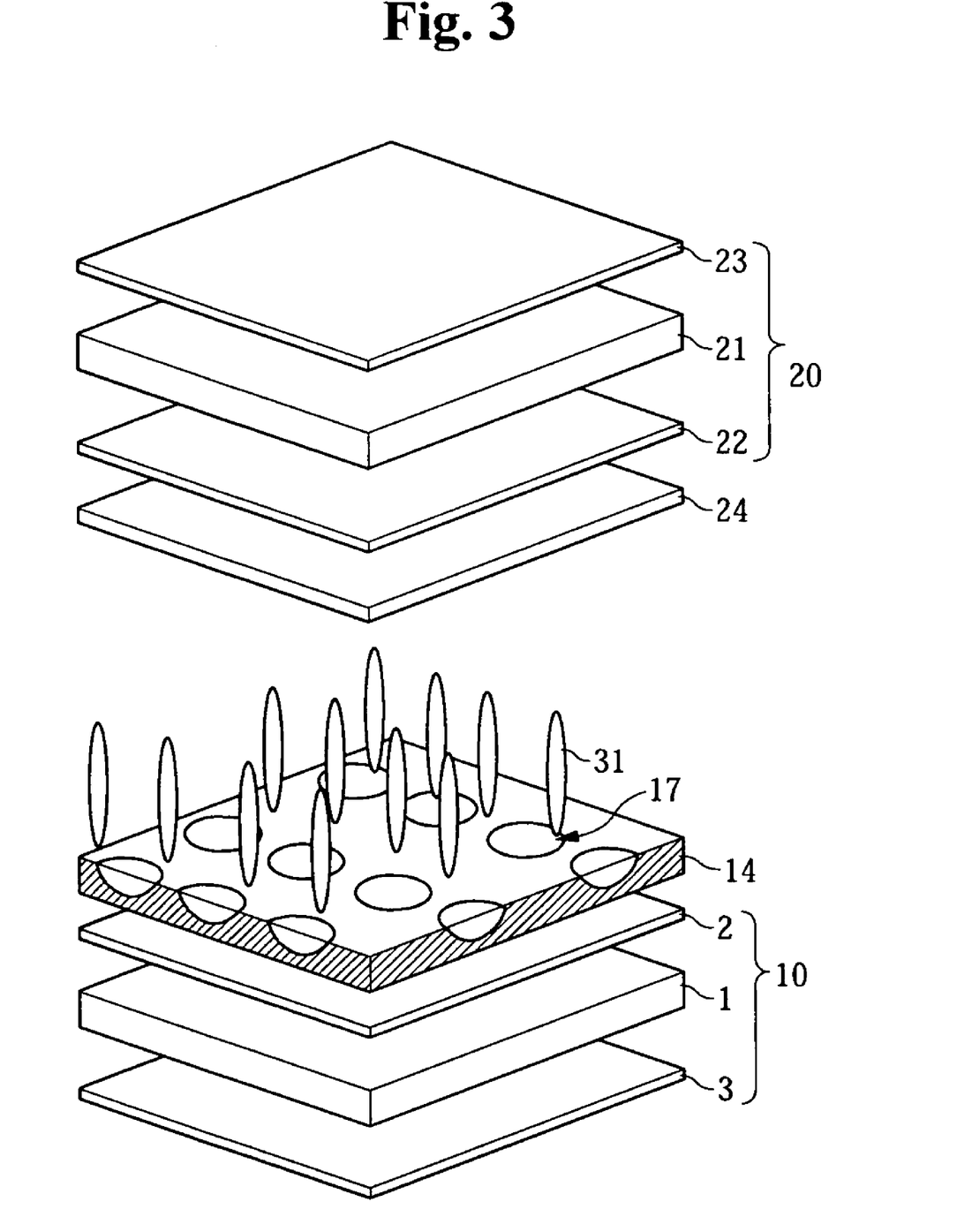
Figure 4:
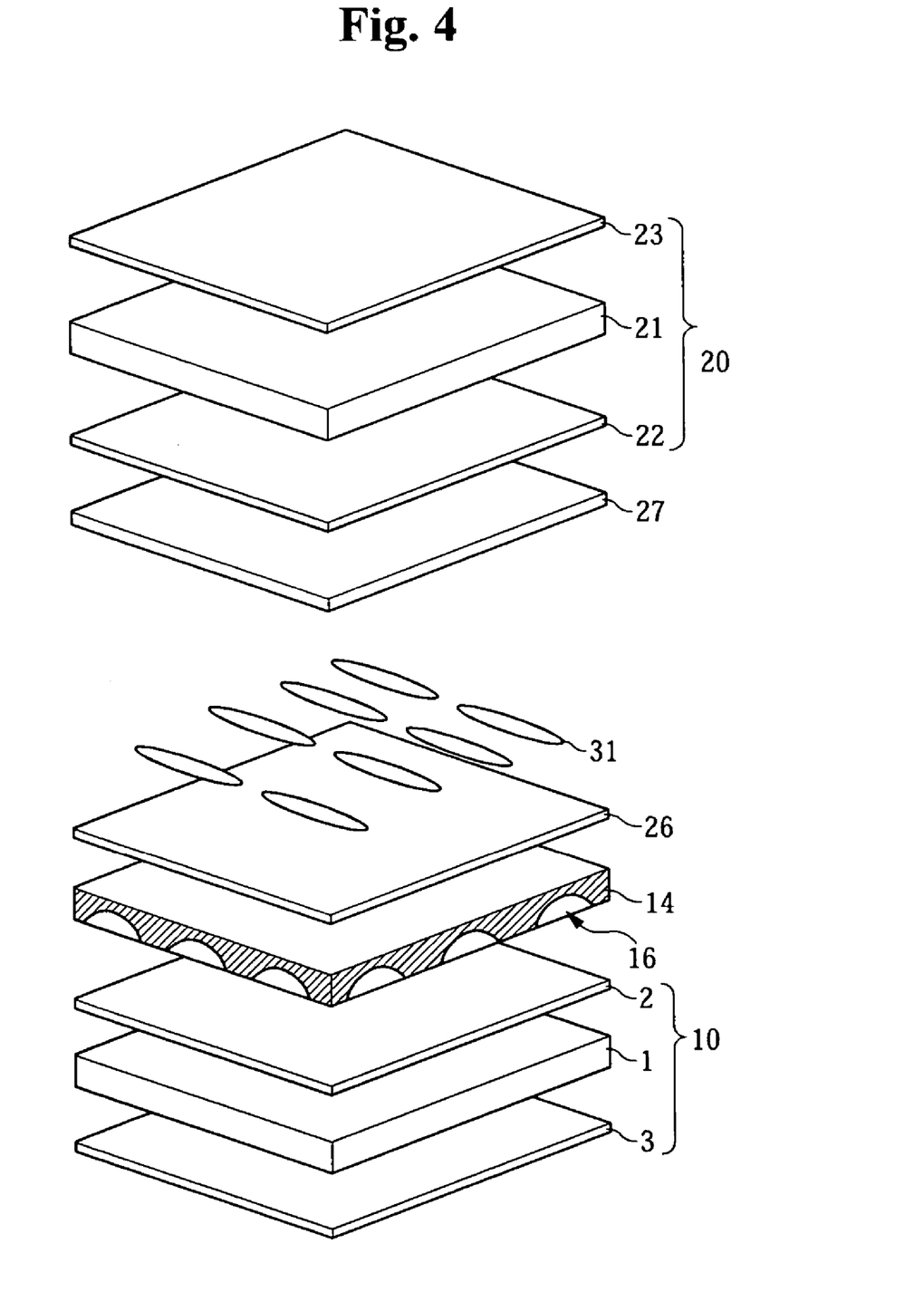
Figure 5:
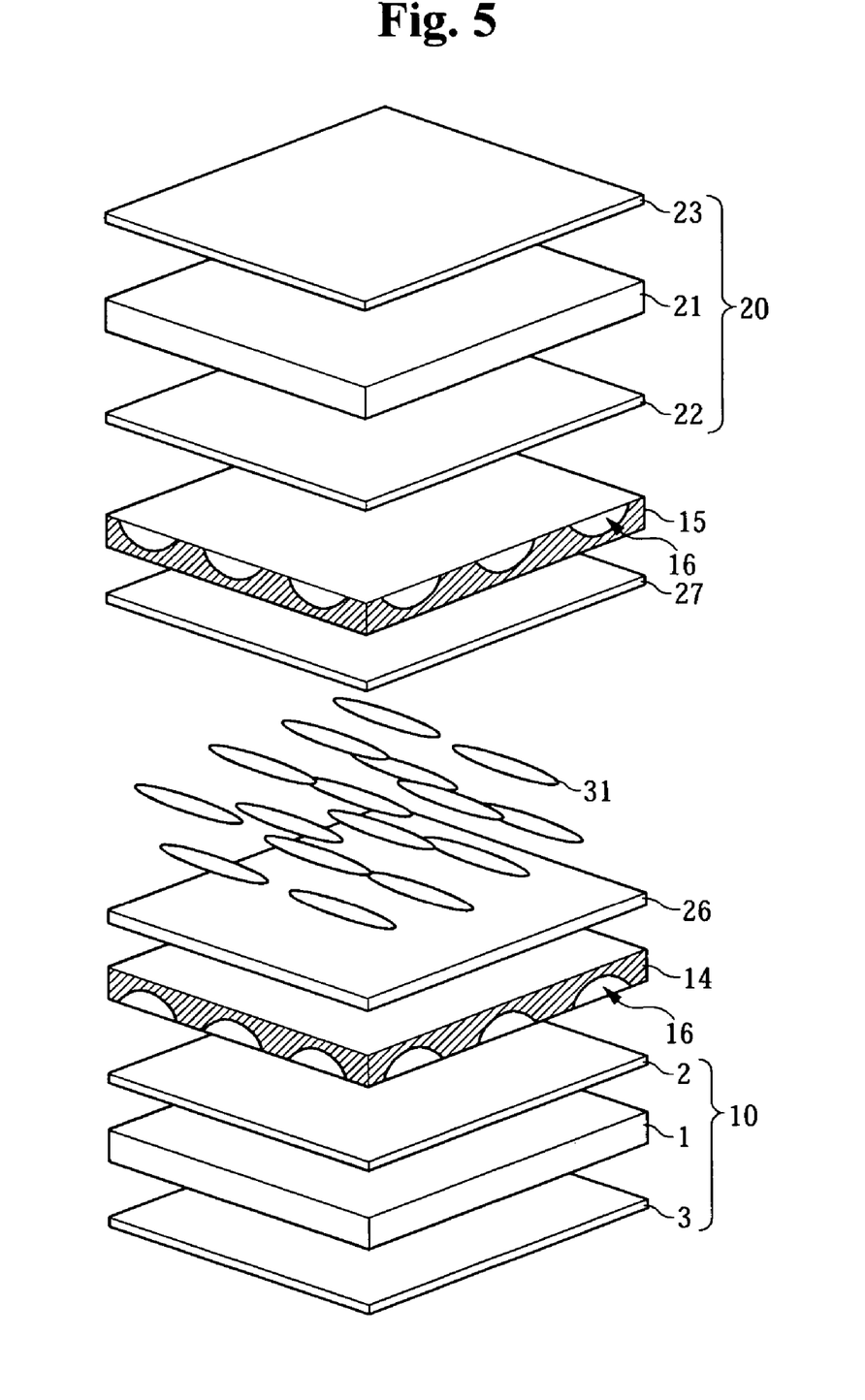
Figure 11A:
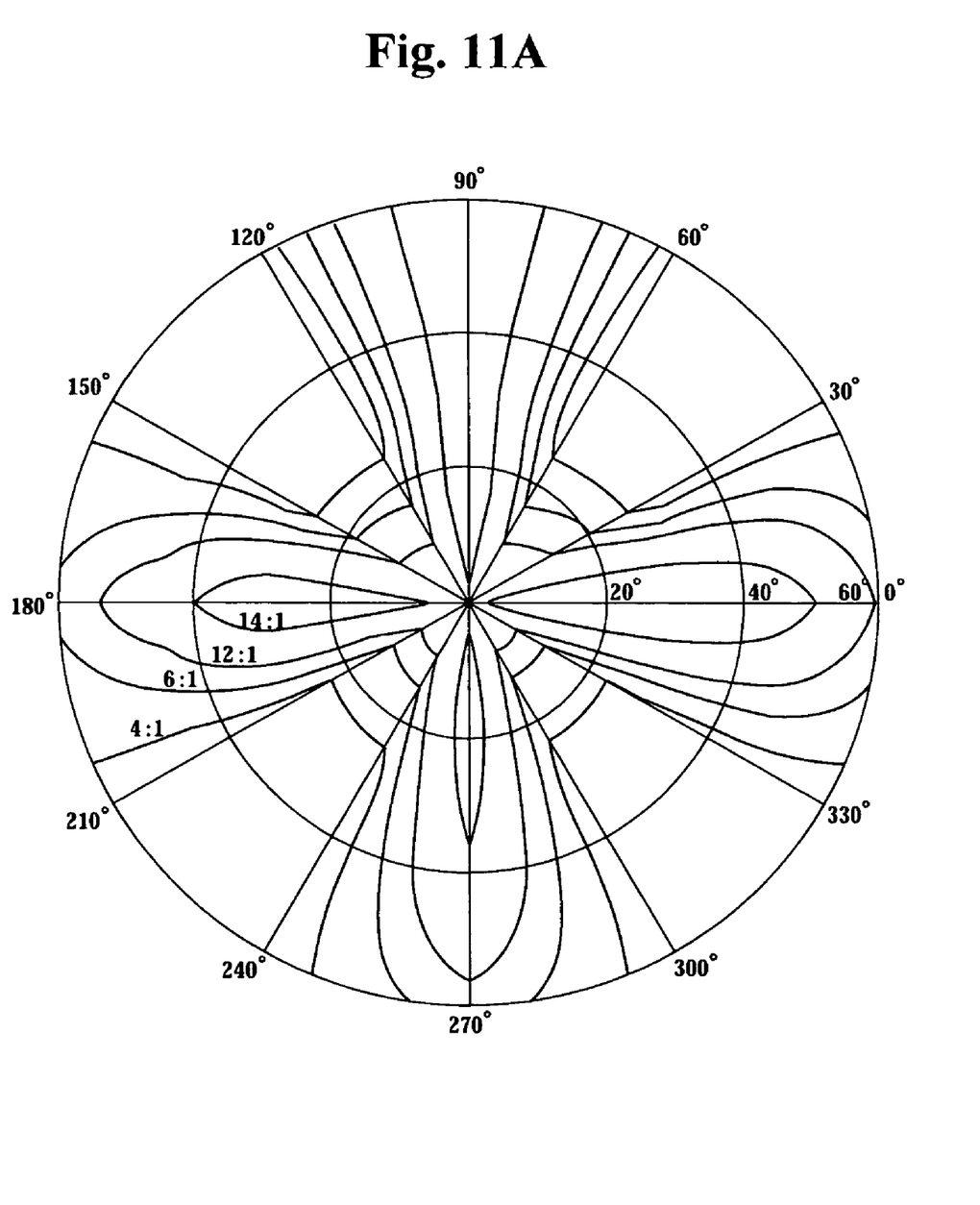
FIG. 11A and FIG. 11B are graphs showing viewing angle characteristics of an LCD according to an embodiment of the present invention.
Figure 11B:
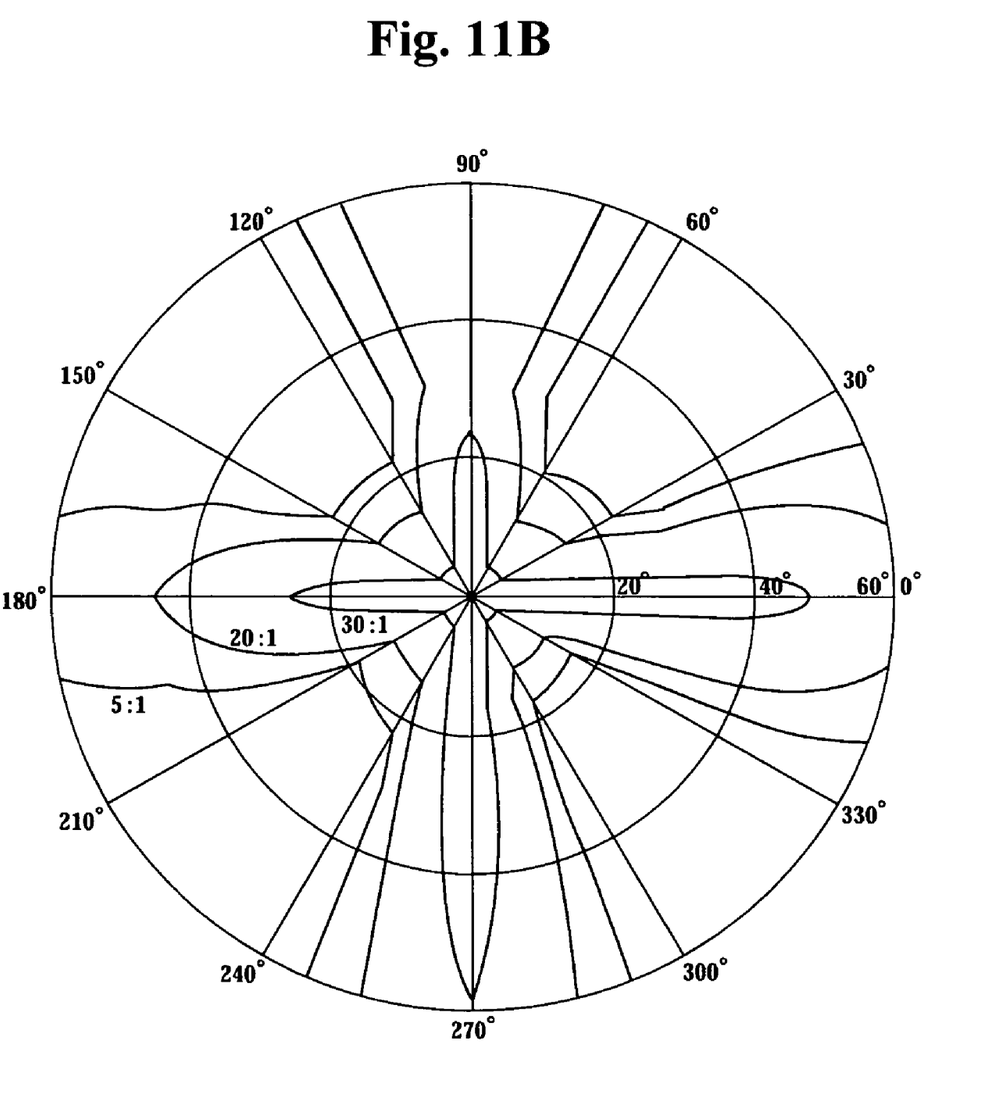

FIG. 11A and FIG. 11B are graphs showing viewing angle characteristics of the LCD shown in FIG. 1 for the voltage difference of about 18V and 24V, respectively. FIG. 11A shows that a wide reference viewing angle of about 60 degrees in upper, lower, left, and right directions was obtained without inversion of contrast ratio when the voltage difference was equal to about 18V. FIG. 11B shows that a wide reference viewing angle of about 60 degrees in upper, lower, left, and right directions was obtained with maintaining a maximum contrast ratio of about 5:1 when the voltage difference was equal to about 24V.

As described above, the patterned alignment film according to the embodiments of the present invention provides multi domains to widen the reference viewing angle. In addition, since the alignment film of the LCD is manufactured by a mold that can be reused, the manufacturing process thereof is simplified and the manufacturing cost is reduced. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display comprising:
    a first substrate;
    a first electrode disposed on the first substrate;
    a second substrate facing the first substrate;
    a second electrode disposed on the second substrate;
    a liquid crystal layer disposed between the first electrode and the second electrode;
    a first alignment film attached on the first electrode and having a position-dependent thickness, the first alignment film has a first surface having a periodical pattern formed by a first portion and a second portion, and a second surface that is substantially flat, the first surface faces the first electrode; and
    a dielectric disposed between the second portion of the first surface of the first alignment film and the first electrode and having a dielectric constant different from the first alignment film,
    wherein the first portion contacts the first electrode and the second portion is spaced apart from the first electrode.

2. The liquid crystal display of claim 1, wherein the periodical pattern of the first alignment film comprises periodically arranged prominences and depressions.

3. The liquid crystal display of claim 1, wherein the dielectric is transparent.

4. The liquid crystal display of claim 1, wherein the dielectric has a dielectric constant equal to about 1 to about 50.

5. The liquid crystal display of claim 1, wherein the dielectric comprises air.

6. The liquid crystal display of claim 1, wherein the first alignment film vertically aligns the liquid crystal layer.

7. The liquid crystal display of claim 6, further comprising a homogeneous alignment layer disposed on the first alignment film.

8. The liquid crystal display of claim 1, further comprising a homogeneous or homeotropic alignment layer disposed on the second electrode.

9. The liquid crystal display of claim 1, further comprising a second alignment film attached on the second electrode and having a position-dependent thickness.

10. The liquid crystal display of claim 1, further comprising:
    a first polarizer attached to the first substrate;
    a second polarizer attached to the second substrate; and
    a light source supplying light to the liquid crystal layer through the first polarizer or through the second polarizer.

11. The liquid crystal display of claim 1, further comprising a polarizer attached to one of the first substrate and the second substrate, wherein the first electrode or the second electrode comprises a reflective electrode.

12. The liquid crystal display of claim 1, wherein the first and the second substrates are flexible.

13. A liquid crystal display comprising:
    a first substrate;
    a first electrode disposed on the first substrate;
    a second substrate facing the first substrate;
    a second electrode disposed on the second substrate;
    a liquid crystal layer disposed between the first electrode and the second electrode;
    a first alignment film attached on the first electrode and having a position-dependent thickness, the first alignment film has a first surface having a periodical pattern formed by a first portion and a second portion, and a second surface that is substantially flat, the first surface faces the first electrode; and
    a dielectric disposed between the second portion of the first surface of the first alignment film and the first electrode and having a dielectric constant different from the first alignment film,
    wherein the first portion of the first surface of the first alignment film and the dielectric form a substantially flat surface.

14. A liquid crystal display comprising:
    a first substrate;
    a first electrode disposed on the first substrate;
    a second substrate facing the first substrate;
    a second electrode disposed on the second substrate;
    a liquid crystal layer disposed between the first electrode and the second electrode;
    a first alignment film attached on the first electrode and having a position-dependent thickness, the first alignment film has a first surface having a depression, and a second surface that is substantially flat, the second surface faces the first electrode; and
    a dielectric contained in the depression and having a dielectric constant different from the first alignment film.

15. The liquid crystal display of claim 14, wherein the first surface of the first alignment film and the dielectric form a substantially flat surface.

16. The liquid crystal display of claim 14, wherein the dielectric is transparent.

17. The liquid crystal display of claim 14, wherein the dielectric has a dielectric constant equal to about 1 to about 50.

* * * * *

UNITED STATES PATENT AND TRADEMARK OFFICE
CERTIFICATE OF CORRECTION

PATENT NO. : 7,898,621 B2  
APPLICATION NO. : 11/439761  
DATED : March 1, 2011  
INVENTOR(S) : Sin-Doo Lee et al.

Page 1 of 1

It is certified that error appears in the above-identified patent and that said Letters Patent is hereby corrected as shown below:

Title Page  
Item (73) Assignee should read:

Assignee(s): Samsung Electronics Co., Ltd.  
Gyeonggi-do, Republic of Korea

Seoul National University Industry Foundation  
Seoul, Republic of Korea

Signed and Sealed this  
Thirteenth Day of September, 2011

David J. Kappos  
*Director of the United States Patent and Trademark Office*